United States Patent
Kirkland et al.

(10) Patent No.: US 9,819,491 B2
(45) Date of Patent: Nov. 14, 2017

(54) SYSTEM AND METHOD FOR SECURE RELEASE OF SECRET INFORMATION OVER A NETWORK

(71) Applicant: Cloudera, Inc., Palo Alto, CA (US)

(72) Inventors: Dustin C. Kirkland, Austin, TX (US); Eduardo Garcia, Austin, TX (US)

(73) Assignee: Cloudera, Inc., Palo Alto, CA (US)

( * ) Notice: Subject to any disclaimer, the term of this patent is extended or adjusted under 35 U.S.C. 154(b) by 68 days.

(21) Appl. No.: 15/149,830

(22) Filed: May 9, 2016

(65) Prior Publication Data

US 2016/0254913 A1 Sep. 1, 2016

Related U.S. Application Data

(63) Continuation of application No. 13/854,773, filed on Apr. 1, 2013, now Pat. No. 9,338,008.

(60) Provisional application No. 61/619,225, filed on Apr. 2, 2012.

(51) Int. Cl.
*G06F 7/04* (2006.01)
*H04L 9/32* (2006.01)
*H04L 29/06* (2006.01)
*H04L 9/08* (2006.01)

(52) U.S. Cl.
CPC .............. *H04L 9/321* (2013.01); *H04L 9/083* (2013.01); *H04L 9/0825* (2013.01); *H04L 63/0442* (2013.01); *H04L 63/10* (2013.01)

(58) Field of Classification Search
CPC ....... H04L 9/321; H04L 9/0825; H04L 9/083; H04L 63/0442; H04L 63/10
See application file for complete search history.

(56) References Cited

U.S. PATENT DOCUMENTS

| | | |
|---|---|---|
| 5,825,877 A | 10/1998 | Dan et al. |
| 6,678,828 B1 | 1/2004 | Pham et al. |
| 6,928,328 B2 | 8/2005 | Deitz et al. |
| 6,931,530 B2 | 8/2005 | Pham et al. |
| 7,076,312 B2 | 7/2006 | Law et al. |
| 7,143,288 B2 | 11/2006 | Pham et al. |
| 7,350,237 B2 | 3/2008 | Vogel et al. |

(Continued)

OTHER PUBLICATIONS

Babaoglu, O., and K. Marzullo, "Consistent global states of distributed systems: Fundamental concepts and mechanisms," *Distributed Systems*, 53 pages, Jan. 1993.

(Continued)

*Primary Examiner* — Sharon Lynch
(74) *Attorney, Agent, or Firm* — Perkins Coie LLP

(57) ABSTRACT

Embodiments of the present disclosure include systems and methods for secure release of secret information over a network. The server can be configured to receive a request from a client to access the deposit of secret information, send an authorization request to at least one designated trustee in the set of designated trustees for the deposit of secret information, receive responses over the network from one or more of the designated trustees in the set of designated trustees and apply a trustee policy to the responses from the one or more designated trustees in the set of trustees to determine if the request is authorized. If the request is authorized, the server can send the secret information to the client. If the request is not authorized, the server denies access by the client to the secret information.

16 Claims, 5 Drawing Sheets

(56) References Cited

U.S. PATENT DOCUMENTS

| | | | |
|---|---|---|---|
| 7,464,162 B2 | 12/2008 | Chan et al. | |
| 7,519,826 B2* | 4/2009 | Carley | G06F 21/40 713/182 |
| 7,734,927 B2* | 6/2010 | Stewart | G06Q 10/06 713/150 |
| 7,941,829 B2* | 5/2011 | Carley | G06F 21/40 713/182 |
| 8,024,560 B1 | 9/2011 | Alten | |
| 8,051,491 B1* | 11/2011 | Cavage | G06F 21/6218 707/609 |
| 8,155,322 B2 | 4/2012 | Bellare | H04L 9/085 380/286 |
| 8,306,919 B2 | 11/2012 | Sakamura et al. | |
| 8,341,707 B2* | 12/2012 | Carley | G06F 21/40 713/182 |
| 8,429,757 B1* | 4/2013 | Cavage | G06F 21/6218 707/609 |
| 8,667,267 B1 | 3/2014 | Garcia et al. | |
| 8,788,815 B1 | 7/2014 | Garcia et al. | |
| 8,806,595 B2* | 8/2014 | Nimashakavi | G06F 21/335 726/6 |
| 8,821,602 B2 | 9/2014 | McAlister | |
| 8,904,181 B1* | 12/2014 | Felsher | H04L 9/0825 380/282 |
| 9,338,008 B1 | 5/2016 | Kirkland et al. | |
| 2001/0034640 A1* | 10/2001 | Chaum | G07C 13/00 705/12 |
| 2002/0073322 A1 | 6/2002 | Park et al. | |
| 2002/0165960 A1* | 11/2002 | Chan | H04L 43/00 709/224 |
| 2002/0184535 A1* | 12/2002 | Moaven | G06F 17/30867 726/4 |
| 2002/0199119 A1* | 12/2002 | Dunnion | G06F 21/10 726/4 |
| 2004/0019807 A1* | 1/2004 | Freund | H04L 63/0227 726/1 |
| 2004/0024477 A1* | 2/2004 | Deitz | G06F 21/40 700/86 |
| 2004/0059924 A1* | 3/2004 | Soto | G06F 21/32 713/186 |
| 2004/0128506 A1* | 7/2004 | Blakley, III | H04L 63/0815 713/170 |
| 2004/0243260 A1* | 12/2004 | Law | G06Q 10/10 700/86 |
| 2005/0033957 A1* | 2/2005 | Enokida | H04L 63/0442 713/156 |
| 2005/0044396 A1* | 2/2005 | Vogel | G06F 21/6218 726/6 |
| 2005/0114650 A1* | 5/2005 | Rockwood | H04L 63/08 713/155 |
| 2005/0114674 A1* | 5/2005 | Carley | G06F 21/40 713/182 |
| 2005/0171983 A1 | 8/2005 | Deo et al. | |
| 2005/0182749 A1 | 8/2005 | Matsui | |
| 2006/0036850 A1* | 2/2006 | Enokida | H04L 63/0442 713/156 |
| 2006/0050877 A1 | 3/2006 | Nakamura | |
| 2006/0143453 A1 | 6/2006 | Imamoto et al. | |
| 2006/0156018 A1 | 7/2006 | Lauer et al. | |
| 2007/0079112 A1 | 4/2007 | Lewis et al. | |
| 2007/0172066 A1* | 7/2007 | Davin | H04L 9/12 380/262 |
| 2007/0177737 A1 | 8/2007 | Jung et al. | |
| 2007/0180255 A1 | 8/2007 | Hanada et al. | |
| 2007/0186112 A1 | 8/2007 | Perlin et al. | |
| 2007/0226488 A1 | 9/2007 | Lin et al. | |
| 2007/0255943 A1 | 11/2007 | Kern et al. | |
| 2007/0256133 A1* | 11/2007 | Garbow | H04L 63/0263 726/26 |
| 2009/0150675 A1* | 6/2009 | Cook | G06Q 10/107 713/175 |
| 2009/0150968 A1* | 6/2009 | Ozzie | H04L 63/08 726/1 |
| 2009/0187966 A1* | 7/2009 | Carley | G06F 21/40 726/1 |
| 2009/0259838 A1 | 10/2009 | Lin | |
| 2009/0307783 A1 | 12/2009 | Maeda et al. | |
| 2010/0008509 A1 | 1/2010 | Matsushita et al. | |
| 2010/0198972 A1 | 8/2010 | Umbehocker | |
| 2010/0242102 A1* | 9/2010 | Cross | G06F 21/32 726/7 |
| 2010/0296652 A1 | 11/2010 | Nakayama et al. | |
| 2010/0313246 A1* | 12/2010 | Irvine | H04L 63/102 726/4 |
| 2010/0325713 A1 | 12/2010 | Kurita et al. | |
| 2011/0023097 A1* | 1/2011 | McDiarmid | H04L 63/08 726/5 |
| 2011/0055578 A1 | 3/2011 | Resch | |
| 2011/0078549 A1 | 3/2011 | Thueringer et al. | |
| 2011/0179470 A1* | 7/2011 | Carley | G06F 21/40 726/4 |
| 2011/0276495 A1 | 11/2011 | Varadarajan et al. | |
| 2011/0302400 A1 | 12/2011 | Maino et al. | |
| 2011/0302417 A1 | 12/2011 | Whillock et al. | |
| 2012/0036357 A1 | 2/2012 | Struik | |
| 2012/0130874 A1 | 5/2012 | Mane et al. | |
| 2012/0131341 A1 | 5/2012 | Mane et al. | |
| 2012/0290850 A1 | 11/2012 | Brandt et al. | |
| 2013/0054976 A1 | 2/2013 | Brown et al. | |
| 2013/0318347 A1* | 11/2013 | Moffat | H04L 63/08 713/168 |
| 2014/0089658 A1 | 3/2014 | Raghuram et al. | |

OTHER PUBLICATIONS

Cheng, Security Attack Safe Mobil and Cloud-Based One-Time Password Tokens Using Rubbing Encryption Algorithm, ACM, Jun. 2011, pp. 304-336.
Corbett et al., "Spanner: Google's Globally Distributed Database," *Transactions on Computer Systems* (*TOCS*), vol. 31, No. 3, 14 pages, Aug. 2013.
Du et al., "A Pairwise Key Predistribution Scheme for Wireless Sensor Networks," ACM, May 2005, vol. 8 Issue 2, pp. 228-258.
Kim et al., Design and Implementation of a Private and Public Key Crypto Processor and Its Applicaiton to a Security System, IEEE, Feb. 2004, vol. 50, Issue 1, pp. 214-224.
Ko et al., "A Study of Encryption Algorithm for RFID tag (SEED: 8 Rounds X 64 bit block)," IEEE, s008, pp. 672-677.
Lamport, L., "Time, clocks, and the ordering of events in a distributed system," *Communications of the ACM*, vol. 21, No. 7, pp. 558-565, Jul. 1978.
Non-Final Office Action for U.S. Appl. No. 13/362,695, dated Apr. 29, 2013, 23 pgs.
Stoller, S.D., "Detecting global predicates in distributed systems with clocks," *Distributed Computing*, vol. 13, No. 2, pp. 85-98, Feb. 2000.

* cited by examiner

SYSTEM AND METHOD FOR SECURE RELEASE OF SECRET INFORMATION OVER A NETWORK

CROSS-REFERENCE TO RELATED APPLICATION(S)

This application is a continuation of U.S. patent application Ser. No. 13/854,773, filed Apr. 1, 2013, entitled "SYSTEM AND METHOD FOR SECURE RELEASE OF SECRET INFORMATION OVER A NETWORK," which claims the benefit of priority under 35 U.S.C. §119(e) to U.S. Provisional Patent Application No. 61/619,225, entitled "System and Method for Secure Release of Secret Information Over a Network," by Kirkland, et al., filed Apr. 2, 2012, both of which applications are hereby fully incorporated by reference herein.

BACKGROUND

The problem of data privacy and information security is generally solved in modern computers and network systems using encryption. Encryption methods, technologies, and products necessarily involve at least one, if not multiple pieces of "secret" information. This information may take the form of keys, passwords, pass phrases, salts, etc. The management of that secret information is quite complicated, in many cases.

In general, it is difficult to use such information securely in places where automation (such as running regular backups, booting, and rebooting systems) is required. In these cases, the secret information is either stored locally on the system (in which case the secret information, such as a key, is completely vulnerable and insecure to an offline attack), or these "automated" processes require human intervention.

In solutions in which the secret data is just stored locally on the system, the file may be stored in an obscure location on disk, in a hidden file, or readable only by a certain user. However, all of these can be subject to offline attacks (where the attacker has local physical access, or remote root access).

This secret data might also be encrypted using a simpler, symmetric pass phrase, but again, the problem arises as to where that wrapping pass phrase is stored. Many (if not most) programs, scripts, or automations just hard code secret values directly into the source code—which is extremely vulnerable to attack through simple inspection. Perhaps the most sophisticated, specialized (and expensive solution) is a technology known as an HSM (hardware security module). This specialized hardware handles key management on a local basis, but requires (near-) physical connections to the hardware requiring keys. Otherwise, human intervention is required to actively provide the necessary keys to the system in real time. As can be appreciated, having a human system administrator ready to physically log into a console each time a server needs access to some secret information is impractical for large scale systems.

SUMMARY

These and other drawbacks in the prior art are overcome in large part by systems and methods as disclosed. In particular, embodiments provide for secure, remote, permissive release of secret information over a network.

A system, according to one embodiment, may include a server for storing one or more pieces of secret information and a client that sends deposits of the secret information to the server for retrieval when needed. In operation, once secret information is required by a client, the client can send a request to the server. In turn, the server can request authorization of the release of information to that client from one or more trustees. Only if the server receives authorization from the trustee(s) is the information allowed to be released. In some implementations, authorization by the trustee(s) is configurable according to a predetermined policy. For example, in some embodiments, a single authorization by any one of a plurality of trustees may be sufficient for release of the information. In others, a majority may be required. In still others, a unanimous consent of all the trustees may be required.

Another embodiment can include a system comprising a data repository storing a deposit of secret information, the deposit associated with a set of designated trustees and a server coupled to the repository and a network. The server can be configured to receive a request from a client to access the deposit of secret information, send an authorization request to at least one designated trustee in the set of designated trustees for the deposit of secret information, receive responses over the network from one or more of the designated trustees in the set of designated trustees and apply a trustee policy to the responses from the one or more designated trustees in the set of trustees to determine if the request is authorized. If the request is authorized, the server can send the secret information to the client. If the request is not authorized, the server denies access by the client to the secret information.

Another embodiment can comprise a computer program product comprising a non-transitory computer readable medium storing a set of computer executable instructions. The set of computer executable instructions can be executable by a processor to, receive over a network a request from a client to access a deposit of secret information in a data repository, the deposit of secret information is associated with a set of designated trustees; send over the network an authorization request to at least one of the designated trustees in the set of designated trustees for the deposit of secret information; receive responses from one or more of the designated trustees in the set of designated trustees; and apply a trustee policy to the responses from the one or more designated trustees in the set of designated trustees to determine if the client is authorized to access the deposit. The computer instructions can be further executable such that if the client is authorized to access the deposit of secret information, send the secret information to the client, but if the client is not authorized to access the deposit of secret information, deny access by the client to the secret information.

Yet another embodiment can comprise a method including the steps of maintaining a set of deposits of secret information in a data repository, each deposit of secret information associated with a corresponding set of designated trustees. For a requested deposit of secret information, requested by a client application over a network, the method can include: sending authorization requests over the network from a server to each of the designated trustees in the corresponding set of designated trustees for the requested deposit of secret information; receiving responses from one or more of the designated trustees in the set of designated trustees; applying, at the server, a trustee policy to the responses from the one or more of the set of designated trustees to determine if the client application is authorized to access the requested deposit of secret information. If the client application is authorized to access the requested deposit of secret information, the method can include encrypting secret information in the requested deposit of secret information and sending the encrypted secret information to the client application from the server over the network. If the client is not authorized to access the deposit of secret information, the method can include denying the client application access to the secret information in the requested deposit of secret information.

DETAILED DESCRIPTION

Figure 1:
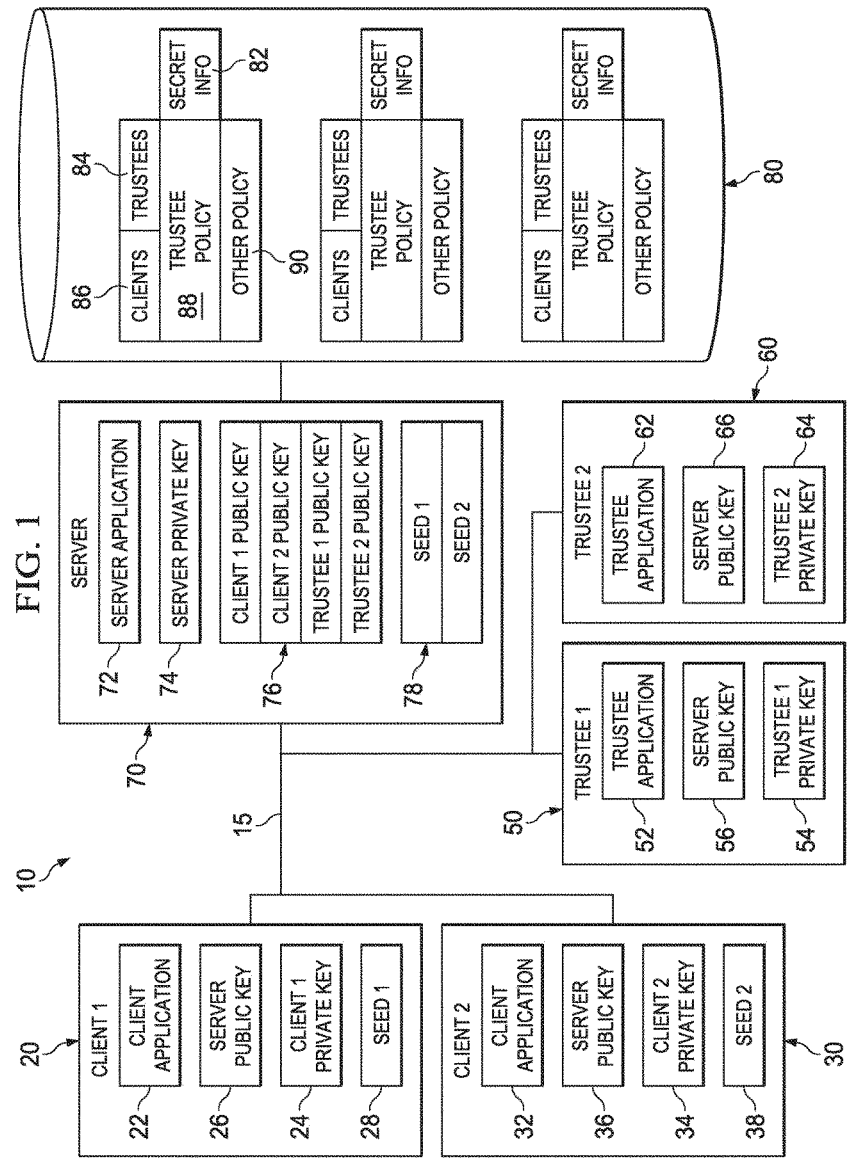
FIG. 1 is a block diagram of a network system in accordance with exemplary embodiments.

Embodiments and various features and advantageous details thereof are explained more fully with reference to the exemplary, and therefore non-limiting, examples illustrated in the accompanying drawings and detailed in the following description. Descriptions of known starting materials and processes may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying systems and methods for secure release of secret information will become apparent to those skilled in the art from this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Embodiments of a system and method for secure and remote release of secret information can employ a client-server architecture. Clients may require access to secret information stored on a server. When a client requests the secret information, the server sends requests to trustees associated with the secret information and releases or does not release the secret information based on responses by the trustees. These trustees may be particular users/machines/applications that are authorized to grant or deny access to this secret information on demand. If there are zero associated trustees, then the server can automatically release the information. If one or more trustees are associated with the secret information, then a configurable trustee policy may be applied. The secret information can be released to the requesting client based on the trustee policy. Per the trustee policy, for example, perhaps a single authorization releases the secret; or perhaps a simple majority; and in an ultra-secure environment, a unanimous vote might be required to release a particular secret.

According to one embodiment, clients can comprise computer systems (physical or virtual/cloud machines) which run services or applications that require access to secret information (including, but not limited to, encryption keys, digital certificates, passwords or pass phrases, encrypted files, etc.). A client can make a remote network request to the server application for the secret information. This request can be digitally signed by the requester, and encrypted such that only the server application can read the request. The server application can verify the signature and decrypt the request using asymmetric public/private key authentication or other authentication. Once the request and requester are validated, the server application sends a (optionally signed and encrypted) message to zero to n trustees, asking permission to release the secret data to the requesting server. Depending on the response from the trustees, the secret data may or may not be released to the requesting client.

Reference is now made in detail to the exemplary embodiments of the disclosure, examples of which are illustrated in the accompanying drawings. Wherever possible, like numerals will be used throughout the drawings to refer to like and corresponding parts (elements) of the various drawings.

FIG. 1 is a diagrammatic representation of one embodiment of a system 10 providing secure and remote access to secret information. System 10 can include one or more client devices (e.g., client 20 and client 30) and one or more trustee devices (e.g., trustee devices 50 and 60) interconnected to a server 70 by a standard transmission channel 15, which may be a wired or wireless network, including a local area network (LAN), wide area network (WAN), the Internet, or other wired and/or wireless network.

Clients, according to one embodiment, can be computer systems (physical or virtual/cloud machines), which themselves run services or applications that require access to secret information (in the form of encryption keys, digital certificates, passwords or pass phrases, etc.) According to one embodiment the client device 20 and client device 30 can each provide a client application (e.g., client application 22 and client application 32). By way of example, but no limitation, the client application 22 and client application 32 may be compiled Windows/Linux/MacOS programs, Android/iOS/Blackberry/WebOS mobile applications, applications running in a browser environment or other applications that register, put, and get information from server 40 over a network protocol, such as http, https or other network protocol.

Client application 22 and client application 32 can each acquire respective public-private key pairs and store the respective private keys (e.g., client 1 private key 24 and client 2 private key 34). It can be noted that multiple client applications may reside on a single client device, with each client application having its own public-private key pair. The client public keys may be transmitted to server 40. Client application 22 and client application 32 can further store a server public key (server public key 26 and server public key 36), which may be the same server public key.

Client application 22 and client application 32 may also include rotating seeds (e.g., client 1 seed 28 and client 2 seed 38). The seeds can be used to enhance security of communications as discussed below in more detail.

Trustee device 50 and trustee device 60 can be devices associated with trusted users, machines, applications or other entities designated as a trustee. Trustee device 50 and trustee device 60 may store trustee applications (e.g., trustee application 52 and trustee application 62). By way of example, but not limitation, trustee application 52 and trustee application 62 may take several different forms, including, but not limited to simple Email and Web applications, Android/iOS/Blackberry/WebOS mobile applications, as well as native compiled clients for Windows/Mac/Linux, applications running in a browser environment or other applications.

According to one embodiment, trustee application 52 and trustee application 62 may acquire public-private key pairs and store the respective private keys (e.g., trustee 1 private key 54 and trustee 2 private key 64). Trustee application 52 and trustee application 62 may also store a copy of a server public key (e.g., server public key 56 and server public key 66), which may be the same server public key stored by other trustees and the clients.

Server 70 can provide a server application 72 configured to communicate with client applications and trustee applications. Server application 72 can maintain a server private key 74 corresponding to the server public key stored by clients and trustees, a store of public keys 76 corresponding to the client private keys and trustee private keys and a set of rotating seeds 78 corresponding to seeds distributed to clients. Seeds may also be distributed to trustees.

Server 70 may maintain a repository 80 that stores secret information and corresponding access control lists, trustee lists, trustee policies and other policies. For example, repository may 80 may include secret information 82 associated with a trustee list 84 a list of authorized clients 86, a configurable trustee policy 88 and any other policies 90 established for the secret information 82. Secret information 82 may include encrypted or non-encrypted encryption keys, digital certificates, passwords, passphrases, files, etc. Accordingly, server 70 may act as a key storage system (KSS) server or the like configured to distribute keys or other sensitive authorization information to requesting applications. Secret information 82 may be encrypted using a client encryption key for which the server 70 does not have the corresponding decryption key. In other cases, server 70 may be provided the encryption keys to fully decrypt secret information for recovery or other purposes.

One advantage to denying server 70 the ability to fully decrypt secret information 82 is that even a user with root level access to server 70 will not be able to access secret information 82. This negates the ability of a hacker or server administrator to gain access to secret information 82 even if they have access to server 70's keys. Consequently, in one embodiment, server 70 can provide a multi-tenant cloud service or other third-party service for storing secret information with a high degree of security. Other embodiments may be implemented as dedicated third-party servers or private servers.

Server application 72 may release secret information to clients upon request and appropriate validation. When a client application (e.g., client application 22 or client application 32) makes a request to take an action on secret information 82, such as retrieving secret information 82, server application 72 can consult the list of authorized clients 86, if one is provided, to determine if the requesting client application is authorized to take the action. If the requesting client application is authorized, server application 72 can send a request to trustees in the list of trustees 84, if one is provided, to authorize release of the secret information. Based on the responses by the trustees and trustee policy 88, server application 72 may permit or deny the action by the requesting client application.

A trustee can comprise any user, machine or application that is designated as having the ability to authorize or participate in authorizing actions on a deposit in repository 80. According to one embodiment, the trustee may be provided with a dedicated trustee application (e.g., trustee application 52 or trustee application 62) for receiving and responding to authorization requests. In other implementations, the trustee may be sent an email or other message requesting authorization. If a trustee application is not provided, the trustee may respond by email, accessing a web site or taking other action through which the trustee is permitted to provide authorization. For example, the trustee may be sent an email stating that an access request has been made. The trustee may then log into a web site to provide authorization. Thus, an authorization request may be sent to the trustee by a first channel and the authorization response received over another channel.

To provide an example, repository 80 can be configured as follows: secret information 82 is an encryption key used at client 20; list of authorized clients 86 lists client application 22 as an authorized client; list of trustees 84 may list trustees corresponding to trustee device 50 and trustee device 60 as designated trustees of secret information 82; and trustee policy 84 requires approval of both trustees to release secrete information 82. In this example, if client application 22 requests secret information 82, server application 72 will consult list of authorized clients 86 and determine that the request can proceed. It can be noted that if client application 32 requests secret information 82 in this example, the request will be denied based on list of authorized clients 86.

Returning to the example in which client application 22 requests secret information 82, server application 72 can send authorization requests to trustees associated with trustee application 52 and trustee application 62. If neither or only one of the trustees approves release of secret information 82, server application 72 will not release the information based on trustee policy 88. If both trustees approve release, server application 72 can provide secret information 82 to client application 22. Client application 22, according to one embodiment, can be configured to maintain the secret information 82 only in volatile memory and discard secret information 82 after use.

It can be noted that in this example, the trustees can have the right and responsibility to release the secret information, but may not have the ability to access the secret information. Furthermore, server 70 may have the responsibility to store and distribute secret information, but not the ability to access the information. Thus, responsibility for using secret information 82 may be provided to a client that does not maintain the secret information, responsibility for persistently storing secret information 82 can be provided by a system that may not have full access to secret information 82 and responsibility for authorizing release of secret information 82 may be provided to a trustee who may not have rights to access secret information 82. Therefore, compromising secret information 82 would require compromising multiple distributed systems having different encryption keys and impersonating potentially several trustees. This can prevent a user (for example, an ex-employee) from being able to gain access to secret information 82, even if the user can gain access to a client application or the server or is still designated as a trustee.

To further enhance security, communications between sever application 72, client application 22, client application 32, trustee application 42 and trustee application 52 may occur over SSL or otherwise and may include multiple layers of encryption. According to one embodiment, the client application 22 can sign requests with the client's private key 24 and encrypt the requests with the server's public key 26. According to one embodiment, the signature can include a unique identifier for the client, such as a hash of the client's public key (a "client fingerprint"). Trustees can use similar mechanisms using the trustee's public/private keys and server public key. Server application 72 can sign communications with the server's private key 74 and encrypt responses to client application 22 with the client's public key and requests to trustee application 260 with the trustee application's public key. Server application 72 can decrypt requests and authorization responses using the server's private key 74 and verify the identity of the sending client or trustee application with the respective client or trustee public key (e.g., by extracting the client fingerprint or trustee fingerprint). Client application 22 can decrypt responses from server application 72 using the client's private key 24 and verify the identity of the server using the server's public key 26. Trustee application 52 can decrypt requests from server application 72 using the trustee private key 54 and verify the identity of the server using the server public key 56.

According to one embodiment, communications between server application 72 and client application 22 may include additional security measures. According to one embodiment, when client application 22 registers with server application 72, server application may generate a seed for client application 22, which can be an arbitrarily long random number or other seed, and provide the seed to client application 22 (seed 28). When client application 22 makes a request to server application 72, client application 22 can encrypt the seed 28 in the message using the server public key 26 or other mechanism. When server application 72 receives the message, server application 72 can decrypt the received seed 28 and compare it against an expected seed for that client application 22. If the received seed matches the expected seed for client application 22, server application 72 can allow the request to proceed (e.g., confirm the client is an authorized client, send authorization requests to trustees, etc.). Server application 72 can generate a new random number and encrypt it with client application's 22 public key in the next response to client application 22. This seed becomes client 1 seed 28 and the expected seed for client application 22. This process can be repeated for each request and response between server application 72 and client application 22. If the received seed received from client application 22 does not match the expected seed server application 72 expects to receive from client application 22, server application 72 can generate an error and not allow the request.

The use of a rotating randomly generated seeds distributed by server application 72 minimizes the likelihood that an unauthorized user who discovered a seed in one communication (e.g., by packet sniffing and breaking decryption) will be able to authenticate with server application 72 as the proper seeds will have changed by the time the unauthorized user discovers the seeds. Seeds may also be used when communicating with trustee applications.

If a client application (e.g., client application 22) can run in multiple instances or threads, the threads may each try to access the client seed (e.g., seed 28). Mechanisms can be provided to prevent conflicts over the of seed 28, such as locking seed 28 for use by one instance or thread for a period of time, providing an array of seeds to client application 22, any one of which can be accepted by server 70 or other mechanism, configuring server 72 to accept a current seed (iteration n), an n−1 seed or n−y seed, where y can allow acceptance of an arbitrary number of past acceptable seeds.

Figure 2:
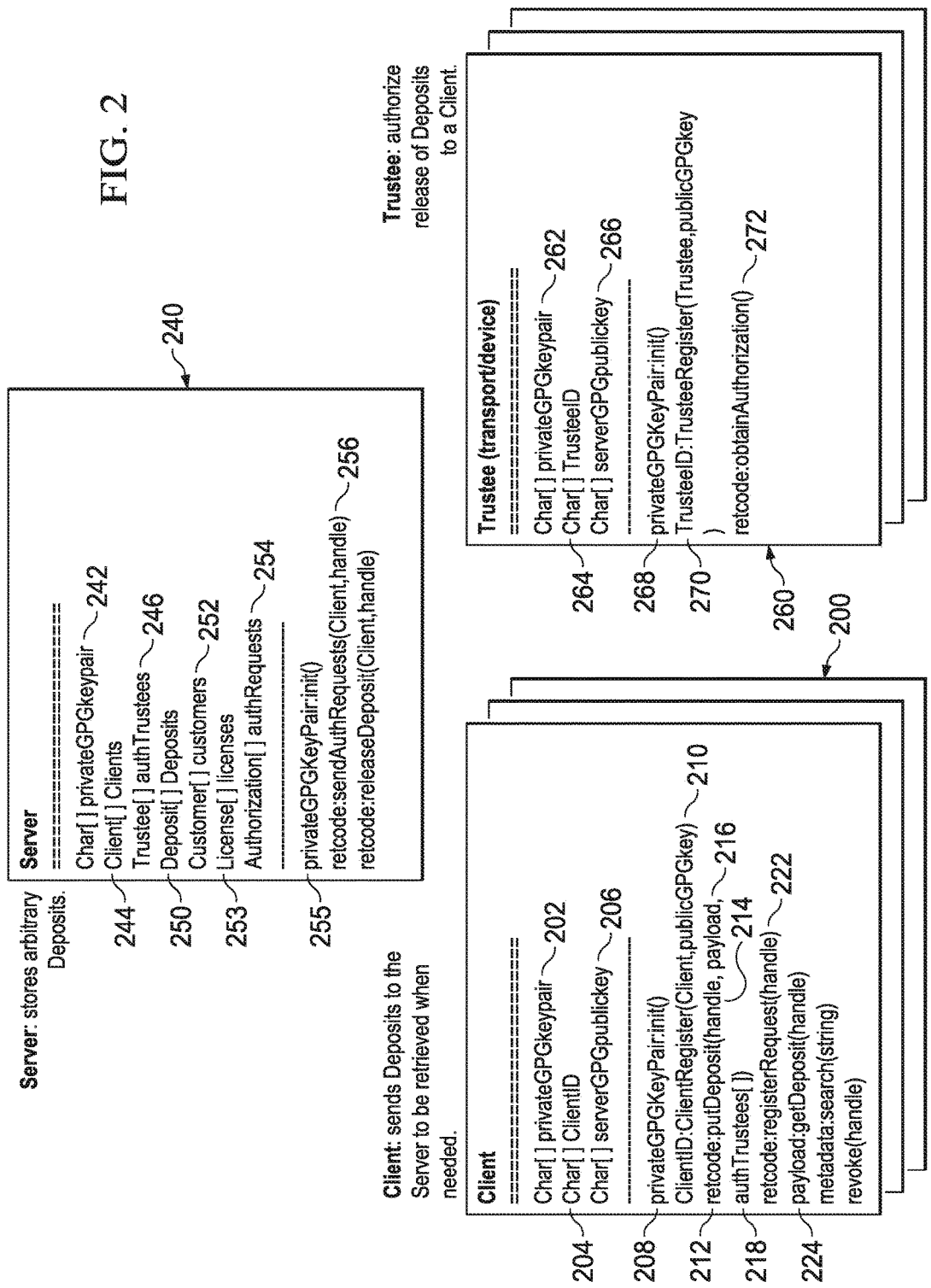
FIG. 2 is a diagrammatic representation of a system comprising client application, a server application and trustee applications.

FIG. 2 is a diagrammatic representation of one embodiment of a plurality of client applications (e.g., client applications 200), a server application 240 and a plurality of trustee applications (e.g., trustee application 260). Each client application or trustee may run on a separate client device or multiple client applications and/or trustee applications may run on the same device. The server application 240 stores arbitrary deposits of secret information that it can release to client applications 200 based on authorization from trustee application 260.

According to some embodiments, public-key cryptography such as GNU Privacy Guard (GPG), Pretty Good Privacy (PGP) or other public-key cryptography is used to verify communications between client application 200 and server application 240. In other embodiments other methods of symmetric or asymmetric cryptography can be used. For purposes of explanation GPG will be used.

Client application 200 maintains a client private encryption key 202, a client ID 204, and receives a server public encryption key 206. Server application 240 maintains a server private encryption key 242, lists of clients and their public keys 244, authorized trustees 246, deposits 250, customers 252, licenses 253, and authorization requests 254. The trustee application 260 maintains a private trustee encryption key 262, a trustee ID 264, and a server public key 266, which may be the same as server public key 206 maintained by client application 200.

In operation, the client application 200 may be configured to make, edit, disable/enable deposits, as well as purge deposits. The server application 240 stores deposits, requests authorization to release deposits from trustees and returns deposits to client application 200. The trustee application(s) 260 authorize the release of deposits to particular client applications/users.

According to one embodiment, each application may be initialized with a public-private key pair. Client application 200 can perform an initialization process 208 to acquire a client public-private key pair, server 240 can perform an initialization process 255 to acquire a server public-private key pair and trustee application 260 can perform an initialization process 268 to acquire a trustee public-private key pair. Each initialization processes may be used to generate the respective public-private key pair, receive the key pairs for a key system or otherwise acquire public-private key pairs. In some embodiments, these are GPG key pairs.

To register, the client application 200 performs a registration process 210 to send a registration request to the server application 240. The registration request can identify the client and include the client public key. Server application 240 stores the client's public key and assigns the client a unique client ID. According to one embodiment, each client application is identified by its public key and more particularly by a shorter hash of its public key (referred to as a "client fingerprint"). Next, the server application 240 sends the client application 200 the client ID and the server public key, which can be stored by client application 200 as Client ID 204 and server public key 206.

Similarly, trustee application 260 can perform a registration process 270 to send a registration request to the server application 240 including the trustee public key. The server application 240 can respond by storing the trustee application public key and assigning a unique Trustee ID. Server application 240 can send the trustee application 260 the Trustee ID and the server public key, which can be stored as Trustee ID 264 and server public key 266, respectively. According to one embodiment, each trustee application is identified by its public key and more particularly by a shorter hash its public key (referred to as a "trustee fingerprint"). Trustee applications for enhanced security may also optionally register the physical hardware as an authorized end point to release the secret, which may be a phone's IMEI or a servers/laptop MAC address among other hardware identification methods.

According to one embodiment, client application 200 can send deposits to server application 240 for storing (represented at putDeposit process 212). The deposit can include a deposit payload containing the secret information or other content of interest, and a set of metadata for the deposit. According to one embodiment, client application 200 can generate a putDeposit request. In some embodiments, the parameters of the putDeposit request include a handle 214, the deposit payload 216, and a list of authorized trustees 218. Handle 214 can provide a name for the deposit that makes the deposit easier to identify. Trustees may be designated in any suitable manner, such as by email address, phone number or otherwise. The trustee information provided by the client application can be correlated to a trustee ID based on information provided by the trustee. In some cases the client may also set a trustee policy. The client may also specify authorized clients that can access the deposit. In one example, the client putting the deposit may not be on the list of clients allowed to later retrieve the deposit. The deposit may also include other descriptive metadata for the deposit.

As noted above, deposit payload 216 can include the secret information or other information of interest. The client can encrypt deposit payload 216 or a portion thereof with a second client private key encryption or otherwise encrypt payload 216 prior to sending the deposit to the server. According to one embodiment, server application 240 is not provided with the public key corresponding to the second private encryption key or other information needed to fully decrypt payload 216. Consequently, server application 240 may not be able to access the contents of payload 216 or the portion of payload 216 containing the secret information (or other content of interest). Thus, while server application 240 may maintain the secret information, the secret information remains secret from server application 240. In other embodiments, the secret information (or other content of interest) may be encrypted in a manner that is recoverable by server application 240. All or a portion of the deposit may be signed using client application 200's private key 202. The deposit and signature can then be encrypted using server public key 206.

The client application 200 sends the putDeposit request to the server application 240. In response, the information associated with the putDeposit request is decrypted using the server application 240's private key 242 corresponding to server public key 206, and the signature is verified using the client public key for client application 200. The deposit payload 216, authorized trustees 218, authorized client information, descriptive metadata, handle 214 and other information are then stored by server application 240. Payload 216 may include multiple layers of encryption such that payload 216 cannot be fully decrypted by server application 240 using the client's public key. Server application 240 can return a unique deposit ID to application 200.

After a deposit is put on the server by client application 200 or other client application, client application 200 can edit the deposit, disable the deposit, enable the deposit or get the deposit. Disabling the deposit marks the deposit so that it cannot be retrieved. Enabling the deposit changes a disabled deposit to an enabled state in which can be retrieved. Purging a deposit removes the deposit from the server. Actions taken by the client on the deposit may have to be authorized by trustees. In some embodiments different trustees and policies may be applied for different actions and/or deposits. In other embodiments, trustee authorization is only required for specific actions, such as retrieving a deposit.

It can be noted that server application 240 can provide search functionality so that client application 200 can search its deposits (or deposits with which it is associated) by metadata such as handles, descriptive information or deposit ID using, for example the metadata:search(string) function.

In order to retrieve a deposit, client application 200 can send a request to server application 240. According to one embodiment, a registerRequest request 222 is created. The registerRequest request 222 includes the deposit handle or other identifier as a parameter. Client application 200 sends the registerRequest request 222 to server application 240. In response to the registerRequest request 222, client application 240 can receive a request ID. Client application 200 can continue to poll the server by sending additional requests, such as a getDeposit request 224 referencing the deposit or request ID. Polling can continue until the deposit is released, the request denied or other condition occurs (timeout, etc.). If the deposit is released, client application 200 can receive the deposit payload.

Server application 240 can receive request 222. If a handle is used in request 222 and there are multiple deposits with the same handle, the server may determine the deposit to which the registerRequest action applies based on rules or default behavior. For example, the server may always assume that a request referencing a handle is referring the most recently stored deposit with that handle. If the requested deposit is associated with a list of permitted clients, server application 240 can determine if the requesting client application 200 is permitted to request the deposit. If the requesting client application 200 is not permitted to request the deposit, server application 240 can take specified actions, such as sending alerts, and end the process. If client application 200 is on the authorized client list for the requested deposit, server application 240 can generate a unique request ID and send the request ID to the client. Server application 240 can further determine the trustees for the deposit and send authorization requests 256 to the trustees.

Authorization requests 256 may be sent to trustees associated with the deposit, via email or according to any other suitable communications channel. Server application 240 can receive authorization responses from trustees and determine if release of the deposit is permitted. Trustee application 260 may obtain authorization to release the request (shown at 272). If a trustee application 260 is not provided, the trustee may respond by email, accessing a web site or taking other action through which the trustee is permitted to provide authorization. For example, the trustee may be sent an email stating that an access request has been made, specifying the client and the deposit. The trustee may then log into a web site to provide authorization. Thus, a trustee may respond on a different communications channel than the channel on which the authorization request 256 was sent to that trustee.

Server application 240 may determine whether to release the requested deposit based on the response(s) by the trustee(s) according to the trustee policy established for the deposit or default policies. In one embodiment, trustees may "vote" to authorize or not authorize the release. According to one embodiment, a trustee may vote "Yes," "No," or "Never." "Never" can be considered a "No" for the request and future requests involving the same client/deposit. Example policies for determining whether to release a deposit include, but are not limited to:

first trustee that says no closes the vote for all
  any of the trustees must authorize
  any 2 of the trustees must authorize
  any N of the trustees must authorize
  a majority of the trustees must authorize
  all of the trustees must authorize (unanimous)

In addition, in some embodiments, in one embodiment, any given trustee may be allowed to say "Never release the information, effectively vetoing any release.

If release is permitted, server application 240 can send the deposit payload to the requesting client application 200. If release is not permitted, server application 240 can take specified actions (e.g., generating alerts, notifying the client, etc.) and end the process.

According to one embodiment, secret data need not be stored in non-volatile memory on the systems that need to use the secret data (e.g., the client). The secret data can be securely retrieved from remote servers, used, and then discarded. Trustees can be queried and prompted on demand of the secret data to authorize or deny the requests, which can immediately release or restrict access the secret data. The release of the managed secret data can be temporarily or permanently locked when a system or a network detects a potential threat or compromise. The trustee who has the authority to release the secret data to the requesting client application does not necessarily need or have access to the raw secret data itself, which can be extremely advantageous in the event of a separation of employment or responsibility of the trustee. Furthermore, the server on which the secret data is stored may not have access to the secret data, allowing secret information to be held on third party servers or cloud servers.

Various communications between sever application 240, client application 200 and trustee application 260 may occur over SSL or otherwise and may include multiple layers of encryption. According to one embodiment, the client application 240 can sign putDeposit, registerRequest and getDeposit requests with the client's private key 202 and encrypt the requests with the server's public key 206. According to one embodiment, the signature can include the client ID (e.g., fingerprint). Server application 240 can sign communications with the server's private key 242 and encrypt responses to application 200 with the client's public key and requests to trustee application 260 with the trustee application's public key. Server application 240 can decrypt requests and authorization responses using the server's private key 242 and verify the identity of the sending client or trustee application with the respective client or trustee public key (e.g., by extracting the fingerprint). Client application 200 can decrypt responses from server application 240 using the client's private key 202 and verify the identity of the server using the server's public key 206. Trustee application 260 can decrypt requests from server application 240 using the trustee private key 262 and verify the identity of the server using the server public key 266.

According to one embodiment, communications between server application 240 and client application 200 may include additional security measures. According to one embodiment, when client application 200 registers with server application 240, server application may generate a seed for client application 200, which can be a random number and provide the seed to client application 200. When client application makes a request to server application 240, client application 200 can encrypt the seed in the message using the server public key 206. When server application 240 receives the message, server application 240 can decrypt the received seed and compare it against an expected seed for that client application 200.

If the received seed matches the expected seed for that client application, server application 240 can allow the request to proceed (e.g., confirm the client is an authorized client, send authorization requests to trustees, etc.). Server application 240 can generate a new random number and encrypt it with client public key in the next response to client application 200. This seed becomes the expected seed for client application 200. This process can be repeated for each request and response between server application 240 and client application 200. If the received seed received from client application 200 does not match the expected seed for client application 200, server application 240 can generate an error and not allow the request.

The use of a rotating randomly generated seeds distributed by server application 240 minimizes the likelihood that an unauthorized user who discovered a seed in one communication (e.g., by packet sniffing and breaking decryption) will be able to authenticate with server application 240 as the proper seeds will have changed by the time the unauthorized user discovers the seeds. One embodiment of communicating between applications using seeds is described in U.S. patent application Ser. No. 13/362,961, entitled "System and Method for Controlling Access to Decrypted Data," filed Jan. 31, 2012, by Garcia, which is hereby fully incorporated by reference herein.

Figure 3:
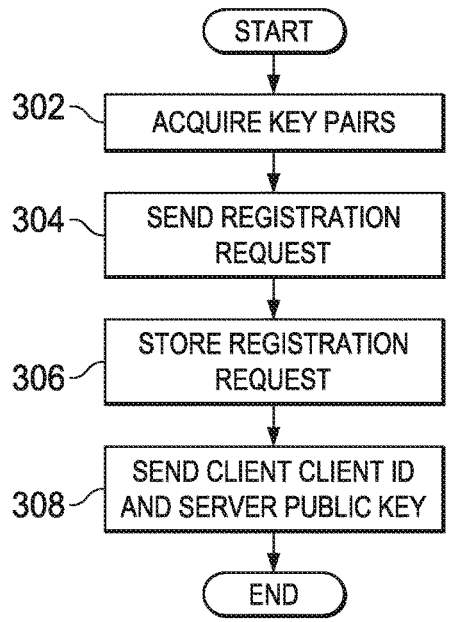
FIG. 3 is a flowchart illustrating initialization and registration according to exemplary embodiments.

Turning now to FIG. 3, a flowchart 300 illustrating initialization and registration is shown. To initialize (step 302), a client application and server application each generate a public-private key pairs, receive the key pairs from a key system or otherwise acquire public-private key pairs. In addition, in some embodiments, a trustee application generates or otherwise acquires its own public-private key pair.

To register, the client application sends a registration request to the server application. The registration request can identify the client and include the client public key. The server responds by storing the client public key and assigning a unique client ID. Next, the server application can send the client application the client ID and the server public key (step 308).

Similarly, the trustee can send a request to the server application including the trustee public key. The server application can respond by storing the trustee public key and assigning a unique trusteeID. The server application can send the trustee application the trustee ID and the server public key. The steps of FIG. 3 can be repeated as needed or desired.

Figure 4:
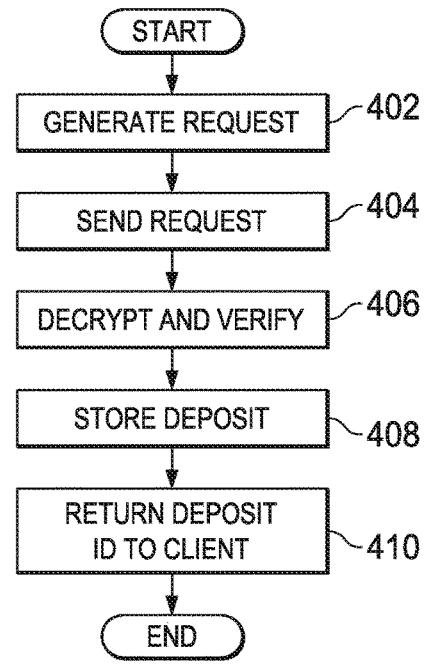
FIG. 4 is a flowchart illustrating storage of deposits according to exemplary embodiments.

FIG. 4 is a flow chart illustrating one embodiment of a method for placing a deposit on a server. The deposit can include a deposit payload containing secret information or other content of interest, and a set of metadata for the deposit. A client can generate a request to the server to store the deposit (step 402). In some embodiments, the parameters of the request include a handle, the deposit payload, and a list of authorized trustees. The handle can provide a name for the deposit that makes the deposit easier to identify. Trustees may be designated in any suitable manner, such as by email address, phone number or otherwise. In some cases the client may also set a trustee policy. The client may also specify authorized clients that can access the deposit. In one example, a client may put a deposit on the server that that client is not able to retrieve. The deposit may also include other descriptive metadata for the deposit.

The deposit payload can include the secret information or other information of interest. The client can encrypt the deposit payload or a portion thereof with a private encryption key for which the server may or may not have the corresponding public encryption key. Consequently, the server may or may not be able to access the contents of the contents of the payload or the portion of the payload containing the secret information (or other content of interest). Thus, while the server application may maintain the secret information, the secret information remains secret from the server application. In other embodiments, the secret information (or other content of interest) may be encrypted in a manner that is recoverable by the server application. All or a portion of the deposit may be signed using client application's client private key for which the server has the corresponding client public key. The deposit and signature can then be encrypted using server application's public key.

The client application request to store the deposit to the server application (step 404). In response (step 406), the information associated with the request is decrypted using the server's private key, and the signature is verified using the client application public key. The deposit payload, trustee authorization information, authorized client information, descriptive metadata, handle and other information are then stored by the server (step 408). Again, the payload may include multiple layers of encryption such that the payload cannot be fully decrypted by the server application using the client's public key. The server application can return a unique deposit ID to the client (step 410). The steps of FIG. 4 can be repeated as needed or desired.

Figure 5:
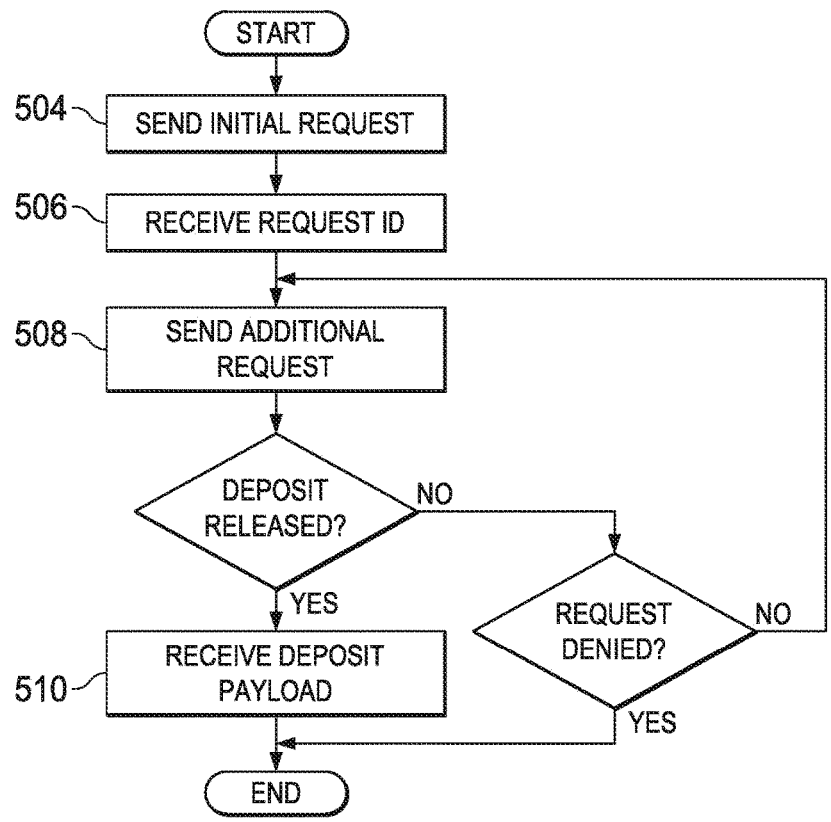
FIG. 5 is a flow chart illustrating one embodiment of requesting deposits.

FIG. 5 is a flow chart of one embodiment of a method for a client to request a deposit. In order to retrieve deposits, a client can send a request for a deposit. According to one embodiment, the client can send an initial request (step 504) to the server identifying the deposit the client wishes to retrieve. In response to the client application can receive a request identifier (step 506). The client can send or more additional requests for the deposit (step 508). According to one embodiment, the client can poll the server by sending additional requests, such as requests referencing the deposit (e.g., by deposit identifier). Polling can continue until the deposit is released, the request denied or other condition occurs (timeout, etc.). If the deposit is released, the client application can receive the deposit payload (step 510). The steps of FIG. 5 can be repeated as needed or desired.

Figure 6:
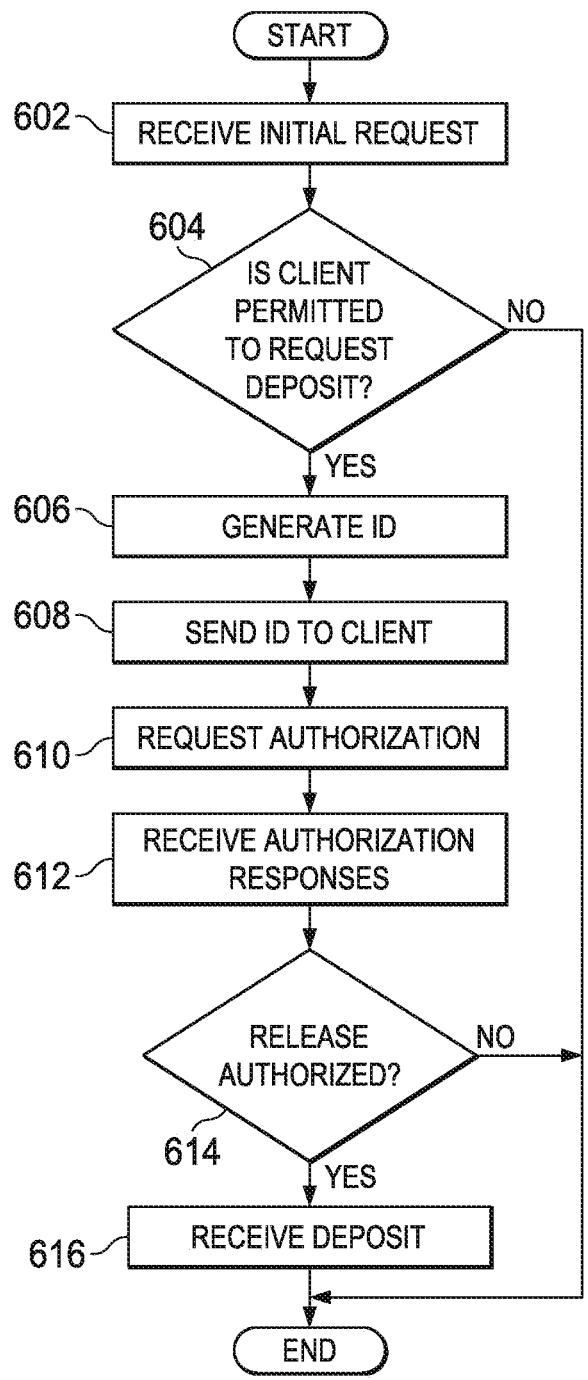
FIG. 6 is a flow chart illustrating one embodiment of requesting authorization.

FIG. 6 is a flow chart illustrating one embodiment of responding to a request for a deposit. The server can receive the client's initial request (step 602). If a handle is used and there are multiple deposits with the same handle, the server may determine the deposit to which the action applies based on rules or default behavior. For example, the server may always assume that a request referencing a handle is referring the most recently stored deposit with that handle. If the requested deposit is associated with a list of permitted clients, the server can determine if the requesting client is permitted to request the deposit (step 604). If the requesting client is not permitted to request the deposit, the server can take specified actions, such as sending alerts, and end the process. If the client is on the authorized client list for the deposit, the server can generate a unique request ID (step 606) and send the request ID to the client (step 608). The server can further determine the trustees for the deposit and send authorization requests to the trustees (step 610).

Authorization requests can be sent to trustees via email or according to any other suitable communications channel. The server can receive authorization responses from trustees (step 612) and determine if release of the deposit is permitted (step 614) based on the policies associated with the deposit. If a trustee application is not provided, the trustee may respond by email, accessing a web site or taking other action through which the trustee is permitted to provide authorization. For example, the trustee may be sent an email stating that an access request has been made. The trustee may then log into a web site to provide authorization. If release is permitted, the server application can send the deposit payload to the requesting client application (step 616). If release is not permitted, the server application can take specified actions (e.g., generating alerts, notifying the client, etc.) and end the process.

Figure 7:
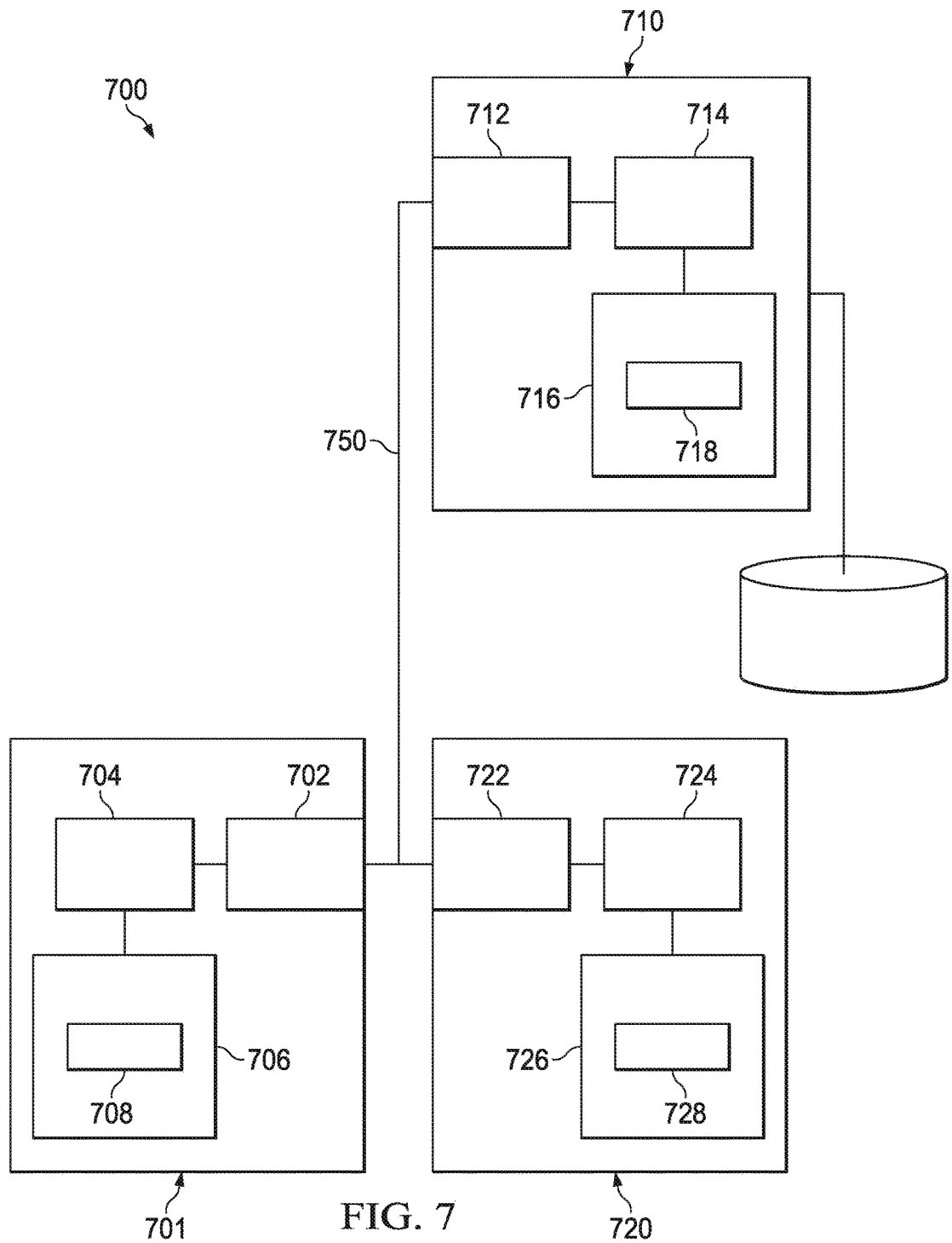
FIG. 7 is a diagrammatic representation of one embodiment of a network system.

FIG. 7 is a diagrammatic representation of one embodiment of a system 700 providing secure and remote access to secret information. System 700 can include one or more client devices 701, one or more servers 710 and one or more trustee devices 720. Client device 701, server 710 and trustee devices 720 can be connected by a standard transmission channel 750, which may be a wired or wireless network, including a local area network (LAN), wide area network (WAN), the Internet, or other wired and/or wireless network.

According to one embodiment, client device 701 can be a computer including a central processing unit ("CPU") (e.g., CPU 702), a network connection device 704, and a non-transitory computer readable medium 706. Computer readable medium 706 can comprise any combination of a primary memory, a secondary memory, a random access memory (RAM), a read only memory (ROM), and/or a magnetic storage device such as a hard drive (HD) or other non-transitory computer readable storage medium. Each computer readable medium may store a number of computer programs. For example, computer readable medium 706 may store client application 708. By way of example, but no limitation, the client application may be compiled Windows/Linux/MacOS program, Android/iOS/Blackberry/WebOS mobile application, or other application that registers, puts, and gets information from the server application over a network protocol, such as http, https or other network protocol. According to one embodiment, client application 708 may be an application running in a browser environment. Client application 708 can be used to communicate with server 710 to request secret information on behalf of itself or another program.

Server 710 can include a plurality of server computer components, including a CPU 712, a network connection device 714, and a non-transitory computer readable medium 716. Computer readable medium 716 can comprise any combination of a primary memory, a secondary memory, a RAM, a ROM, and/or a magnetic storage device such as a HD or other non-transitory computer readable storage medium. Computer readable medium 716 may store a number of computer programs. As shown in FIG. 7, server 710 may store a trustee server application 718. By way of example, but not limitation, server application 718 may be a compiled program and web service that sends and receives messages to both client applications and trustee applications over a network protocol such as http, https, smtp, or others. The server application may be distributed over multiple servers including web servers and/or application servers. Server 710 may be coupled to a repository 760 that stores secret data, along with access control information, trustee lists and configurable policies.

Trustee devices 720 can include a plurality of computer components, including a CPU 722, a network connection device 724, and a non-transitory computer readable medium 726. Computer readable medium 726 can comprise any combination of a primary memory, a secondary memory, a RAM, a ROM, and/or a magnetic storage device such as a HD or other non-transitory computer readable storage medium. Computer readable medium 726 may store a number of computer programs. As shown in FIG. 7, a trustee device 720 may store a trustee application 728. By way of example, but not limitation, trustee application 728 may take several different forms, including, but not limited to simple Email and Web applications, Android/iOS/Blackberry/WebOS mobile applications, as well as native compiled clients for Windows/Mac/Linux or applications running in a browser environment.

Embodiments disclosed herein may be implemented in suitable software including computer-executable instructions. As one skilled in the art can appreciate, a computer program product implementing an embodiment disclosed herein may comprise one or more non-transitory computer readable storage media storing computer instructions translatable by one or more processors in computing environment. Examples of computer readable media may include, but are not limited to, volatile and non-volatile computer memories and storage devices such as ROM, RAM, HD, direct access storage device arrays, magnetic tapes, floppy diskettes, optical storage devices, etc. In an illustrative embodiment, some or all of the software components may reside on a single server computer or on any combination of separate server computers. The various modules describe above may be implemented as portions of the same program, different stand alone programs, portions of larger programs, plug-ins, or according to other suitable programming architecture.

Embodiments disclosed herein may be implemented in suitable software including computer-executable instructions. As one skilled in the art can appreciate, a computer program product implementing an embodiment disclosed herein may comprise one or more non-transitory computer readable storage media storing computer instructions translatable by one or more processors in computing environment. Examples of computer readable media may include, but are not limited to, volatile and non-volatile computer memories and storage devices such as ROM, RAM, HD, direct access storage device arrays, magnetic tapes, floppy diskettes, optical storage devices, etc. In an illustrative embodiment, some or all of the software components may reside on a single server computer or on any combination of separate server computers. The various modules describe above may be implemented as portions of the same program, different stand alone programs, portions of larger programs, plug-ins, or according to other suitable programming architecture.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Although the foregoing specification describes specific embodiments, numerous changes in the details of the embodiments disclosed herein and additional embodiments will be apparent to, and may be made by, persons of ordinary skill in the art having reference to this description. In this context, the specification and figures are to be regarded in an illustrative rather than a restrictive sense, and all such modifications are intended to be included within the scope of this disclosure.

We claim:

1. A method for a computer system to securely manage secret information over a network, the system having a server being communicatively coupled to one or more trustees, the method being performed by the server and comprising:
   receiving a secret payload from a depositing client, wherein the secret payload is encrypted by a client public key and can only be decrypted with a client private key, which is not possessed by either the server or the trustees;
   receiving, from the depositing client, companion information associated with and specific to the secret payload, wherein the companion information is encrypted by a server public key and can only be decrypted with a server private key, which is possessed by the server, and wherein the companion information includes rules for accessing the secret payload, the rules identifying a list of trustees from the one or more trustees and a trustee policy that specifies a manner necessary for the list of trustees to approve access requests to the secret payload;
   storing the secret payload along with the companion information;
   receiving, from a requesting client, an access request to access the secret payload, the access request being encrypted by the server public key and including a seed, wherein the seed is randomly generated by the server and assigned to the requesting client in a preceding transaction;
   decrypting the access request using the server private key;
   verifying a validity of the access request based on the seed;
   after the access request is verified, sending an authorization request regarding the access request to each trustee in the list of trustees, wherein each authorization request sent to each trustee from the list of trustees is encrypted with a trustee public key that corresponds to a respective trustee;
   receiving responses to the authorization requests from the list of trustees;
   applying the trustee policy to the received responses to determine whether to disseminate the secret payload; and
   selectively disseminating the secret payload to the requesting client based on a result of applying the trustee policy and causing the requesting client to limit storage of the disseminated secret payload to a volatile memory.

2. The method of claim 1, wherein the seed is valid for a single transaction only.

3. The method of claim 1, wherein the companion information further includes a list of authorized requesting clients.

4. The method of claim 1, wherein the requesting client is the depositing client.

5. The method of claim 1, further comprising:
   causing the depositing client to delete a local copy of the secret payload.

6. The method of claim 1, wherein the responses from the list of trustees are encrypted with the server public key.

7. The method of claim 1, wherein the disseminated secret payload is encrypted with the client public key.

8. The method of claim 1, wherein each secret payload has a unique companion information.

9. A computer system to securely manage secret information over a network, the system comprising:
   a server communicatively coupled to one or more trustees, wherein the server comprises one or more processors and memory and is configured to:
      receiving a secret payload from a depositing client, wherein the secret payload is encrypted by a client public key and can only be decrypted with a client private key, which is not possessed by either the server or the trustees;
      receiving, from the depositing client, companion information associated with and specific to the secret payload, wherein the companion information is encrypted by a server public key and can only be decrypted with a server private key, which is possessed by the server, and wherein the companion information includes rules for accessing the secret payload, the rules identifying a list of trustees from the one or more trustees and a trustee policy that specifies a manner necessary for the list of trustees to approve access requests to the secret payload;
      storing the secret payload along with the companion information;
      receiving, from a requesting client, an access request to access the secret payload, the access request being encrypted by the server public key and including a seed, wherein the seed is randomly generated by the server and assigned to the requesting client in a preceding transaction;
      decrypting the access request using the server private key;
      verifying a validity of the access request based on the seed;
      after the access request is verified, sending an authorization request regarding the access request to each trustee in the list of trustees, wherein each authorization request sent to each trustee from the list of trustees is encrypted with a trustee public key that corresponds to a respective trustee;
      receiving responses to the authorization requests from the list of trustees;
      applying the trustee policy to the received responses to determine whether to disseminate the secret payload; and
      selectively disseminating the secret payload to the requesting client based on a result of applying the trustee policy and causing the requesting client to limit storage of the disseminated secret payload to a volatile memory.

10. The system of claim 9, wherein the seed is valid for a single transaction only.

11. The system of claim 9, wherein the companion information further includes a list of authorized requesting clients.

12. The system of claim 9, wherein the requesting client is the depositing client.

13. The system of claim 9, the method performed by the server further comprising:
    causing the depositing client to delete a local copy of the secret payload.

14. The system of claim 9, wherein the responses from the list of trustees are encrypted with the server public key.

15. The system of claim 9, wherein the disseminated secret payload is encrypted with the client public key.

16. The system of claim 9, wherein each secret payload has a unique companion information.

* * * * *

UNITED STATES PATENT AND TRADEMARK OFFICE
CERTIFICATE OF CORRECTION

PATENT NO. : 9,819,491 B2
APPLICATION NO. : 15/149830
DATED : November 14, 2017
INVENTOR(S) : Dustin C. Kirkland et al.

It is certified that error appears in the above-identified patent and that said Letters Patent is hereby corrected as shown below:

On the page 2, in Column 2, under "Other Publications", Line 10, delete "Applicaiton" and insert -- Application --, therefor.

In Column 8, Line 32, delete "the of" and insert -- the --, therefor.

In Column 11, Line 48, delete ""Never" and insert -- "Never" --, therefor.

In Column 13, Line 37, delete "that that" and insert -- that --, therefor.

Signed and Sealed this
Twenty-second Day of May, 2018

Andrei Iancu
*Director of the United States Patent and Trademark Office*